United States Patent

Haag

[11] 3,986,809
[45] Oct. 19, 1976

[54] APPARATUS AND METHOD FOR REMOVING MOLDS FROM ARTICLES WITH UNDERCUT PIECES

[75] Inventor: John Henry Haag, Evansville, Ind.
[73] Assignee: Ball Corporation, Muncie, Ind.
[22] Filed: Feb. 19, 1975
[21] Appl. No.: 551,179

Related U.S. Application Data

[62] Division of Ser. No. 118,800, Feb. 25, 1971, Pat. No. 3,898,315.

[52] U.S. Cl. .......................... 425/388; 425/436 R
[51] Int. Cl.² ........................................ B29C 17/04
[58] Field of Search ............ 264/312, 318, 334–336; 425/DIG. 58, 388, 436, 438, 441, 442

[56] References Cited
UNITED STATES PATENTS

| | | |
|---|---|---|
| 3,387,334 | 6/1968 | Belanger et al. ............ 425/DIG. 58 |
| 3,516,122 | 6/1970 | Schwartz ............................. 425/388 |
| 3,518,725 | 7/1970 | Donofrio ............................. 425/388 |
| 3,602,949 | 9/1971 | Kaut .................................... 425/186 |
| 3,709,968 | 1/1973 | Houghton .......................... 425/388 |

Primary Examiner—Ronald J. Shore
Assistant Examiner—Carl Rowold
Attorney, Agent, or Firm—Gilbert E. Alberding

[57] ABSTRACT

Apparatus for progressively removing an inflexible undercut male mandrel pivotally attached to a platen from an undercut article formed about the mandrel by, for example, vacuum forming, wherein angular rotation of the mandrel in relation to the article permits progressive removal with regard to the undercut portion of the article.

6 Claims, 4 Drawing Figures

APPARATUS AND METHOD FOR REMOVING MOLDS FROM ARTICLES WITH UNDERCUT PIECES

This is a division of application Ser. No. 118,800 filed Feb. 25, 1971 now U.S. Pat. No. 3,898,315.

BACKGROUND OF THE INVENTION

1. Field of the Invention

This invention relates generally to apparatus for removing articles from molds, and more particularly to removing undercut articles from their corresponding undercut molds.

2. Discussion of the Prior Art

Many articles of rubber, plastic, and other materials are mold-formed by pressure differential, such as vacuum molding. Vacuum molding is a means of pulling sheet material tightly against a mold form by the introduction of a vacuum form within the mold form.

Apparatus and methods for removing articles from their molds have wide application. Many apparatus and methods have been devised for removing the articles, once formed, from their corresponding molds. The various apparatus and methods have required varying types of molds, e.g., flexible, inflexible, movable, and separable molds. The types of molds used depends upon the type or shape of the article being formed. When the article was formed in portions and later sealed together, the type of mold, as to whether it was flexible, separable, etc., depended on factors other than the shape of the article itself. However, in forming undercut articles, the article of necessity is formed in sections and later sealed together, or the mold itself is in sections to split away from the article after it is formed.

When a whole undercut article is formed about a one-piece male mold mandrel, it was necessary that the mandrel be flexible, e.g., hard rubber, to facilitate removal of the mandrel from the undercut articles formed thereon. Thus, after the article is formed, the mandrel is removed from the undercut article because of the mandrel's flexibility without deforming the formed article.

There are disadvantages in using the rubber mandrel. The mandrel's flexiblity does not permit formation of articles having sharp, intricate design as can be produced by utilizing a solid mandrel.

Another disadvantage is in cooling the article, particularly plastic articles which are formed about the undercut mandrel. Non-uniform cooling may produce cracks due to localized stresses to be found in the molding material. Thus, water tubes are placed within the rubber mandrel in order to provide a more uniform cooling of the material surrounding the mandrel. However, due to the poor heat conduction characteristics of a rubber mandrel, a certain amount of non-uniform cooling is unavoidable.

SUMMARY OF THE INVENTION

This invention provides apparatus for removing an inflexible mold mandrel from an undercut plastic article formed about the mandrel.

The mandrel is progressively removed from the article by pivotally attaching the mandrel to a platen. The platen is reciprocally movable relative to the positioned material. Initially, the movement of the platen toward the sheet material presses the mandrel into the sheet material. Simultaneously, a differential pressure is applied from within the mandrel to assist in pulling the sheet material about the mold mandrel. After the sheet material assumes the shape of the mandrel and somewhat cooled, the platen is moved away from the newly formed article. The pivotal attachment, e.g., by hinges of the mandrel to the platen, causes the progressive removal of the mandrel from the formed article as the platen is moved away from the formed article. Thus, the distortion and accompanying forces are, at any given time, localized and easily accomodated.

Several advantages occur with the use of this apparatus of removing inflexible mold mandrels from articles with undercut portions.

The inflexible mold mandrel, preferably of aluminum, clearly holds a design or shape more accurately than a flexible rubber mandrel. The rubber mandrel also wears much faster due to the continuous molding pressures and required flexing during removal of the rubber mandrel from the undercut formed article.

For quick formation of articles and removal of the mandrel, it is advantageous to provide the mandrel a plurality of tubes for the circulation of a cooling liquid, e.g., water. The circulated water provides for quickly cooling the articles wherein the articles harden for removal of the mandrel. Non-uniform cooling of the article can cause stresses and cracking in the article. With the use of a rubber mandrel, a certain amount of non-uniform cooling is unavoidable due to its poor heat conductivity. However, in using an inflexible, e.g., aluminum, mandrel, excellent uniform cooling results because of aluminum's excellent heat conductivity and capacity.

The inflexible aluminum mandrel provides for a quick release apparatus with limited temporary article deformation due to the progressive removal action provided by the pivotal attachment of the mandrel. A rubber mandrel, on the other hand, has a greater chance for causing article formation since it is pulled directly from the article, with primary reliance on the mandrel's flexibility to prevent article deformation. However, the rubber mandrel always requires striking a balance between flexibility for removal with hardness for article formation. It is no longer necessary to strike the balance with the disclosed apparatus and method.

It is therefore an object of this invention to provide an improved apparatus for progressively removing a mold mandrel from an undercut article formed about a mold mandrel.

It is another object of this invention to provide an improved apparatus for progressively removing an inflexible mold mandrel from an undercut article formed about the mandrel.

It is still another object of this invention to provide an apparatus for pivotably attaching the inflexible mold mandrel such that, as the mandrel is withdrawn from the article, it is progressively removed from the formed article wherein removal is affected with limited temporary deformation of the article formed about the mandrel.

It is yet another object of this invention to provide an apparatus for more uniform cooling of the article formed about the inflexible mold mandrel.

These and other objects will become apparent upon consideration of the detailed description. Modifications to the precise embodiment of this invention are within the scope of this invention.

BRIEF DESCRIPTION OF THE DRAWINGS

The accompanying drawings illustrate a complete embodiment of the invention according to the best mode thus far devised for the practical application of the principles thereof, in which.

DETAILED DESCRIPTION OF THE PREFERRED EMBODIMENT

Figure 1:
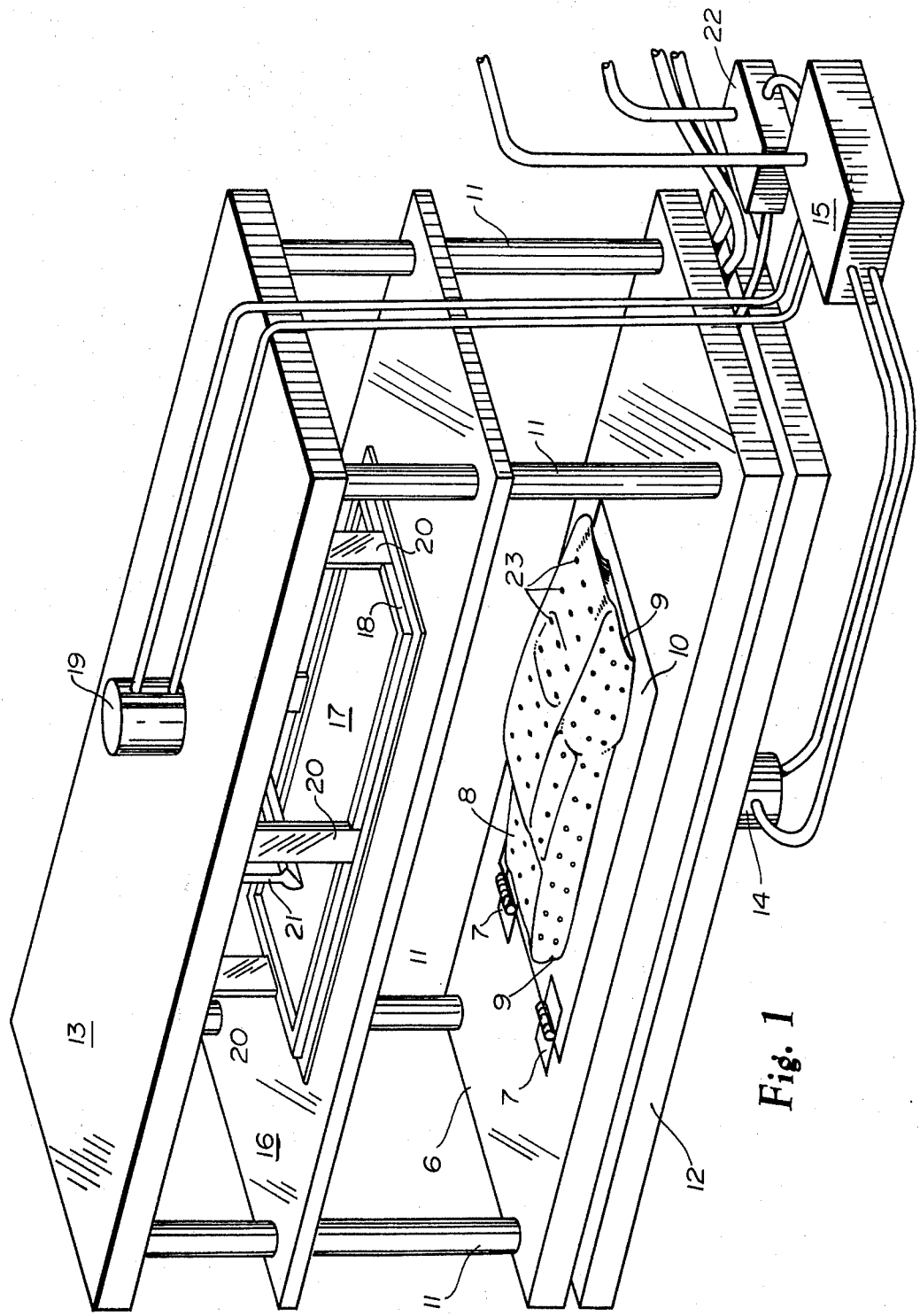
FIG. 1 is a perspective view of the apparatus for removing an inflexible mold mandrel from the article formed thereon.

Referring now to the drawings in which like numerals have been used for like components, the apparatus for forming undecut articles 5 includes a lower forming member or platen 6 which has pivotally attached to it by means of hinges 7 a plate 10 which supports inflexible mold mandrel 8 having undercut portions 9 thereon, the plate 10 being hinged at one end 10' thereof to the platen 6. Platen 6 is reciprocally movable on posts 11 which posts 11 are seated in lower framework 12 and upper framework 13.

The reciprocal movement of platen 6 is provided by the hydraulic motor 14 which is controlled by control unit 15, said control unit being attached to a high pressure source, not shown. Frame 16, for supporting sheet materials 17, is also attached to posts 11. The sheet materials 17 are fixedly positioned on frame 16 by clamp means 18 which are attached to a hydraulic motor 19 by attachment means 20. Hydraulic motor 19 is also attached to control unit 15 wherein the reciprocal movement of platen 6 and the clamping movement of clamp means 18 are in a timed relationship. The motor 19 and posts 11 provide means for effecting reciprocal nonpivoting movement of the sheet securing means 16 and the platen 6 with respect to each other. Surfaces 20 of platen 6 provide means for allowing no relative pivotal movement between the mold mandrel mounting plate 10 and the platen 6 during movement of the platen 6 and sheet securing means 16 toward each other, while allowing relative pivotal movement when they are moved away from each other.

A plug assist 21 may be optionally provided to assist in pressing the sheet material 17 about the undercut mandrel 8.

The differential pressure regulator 22 is preferably provided to connect a differential pressure source, not shown, with the outlets 23 to the surface of the inflexible undercut mandrel such that, when a differential pressure is applied, the sheet material 17 is pulled about the inflexible undercut mandrel 8 simultaneously with the movement of the mandrel 8 into the sheet material 17. The differential pressure regulator 22 is also connected to control unit 15 wherein the differential pressure is applied in timed relationship to the reciprocal movement of platen 6 and the clamping action of clamp means 18.

Also optionally provided is a source of water supply, not shown, which is connected to a series of water tubes 25 which run throughout the inflexible undercut mandrel 8 near the surface in contact with the formed article to provide uniform cooling of the plastic article formed from sheet material 17.

Figure 2:
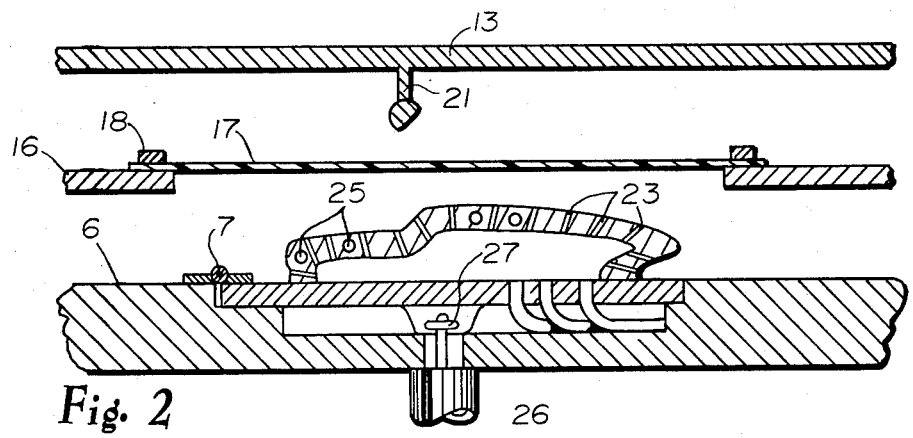
FIGS. 2 through 4 are partial cross-sectional views of the article removing apparatus shown in FIG. 1 illustrating the various positions of the apparatus in operation.
Figure 3:
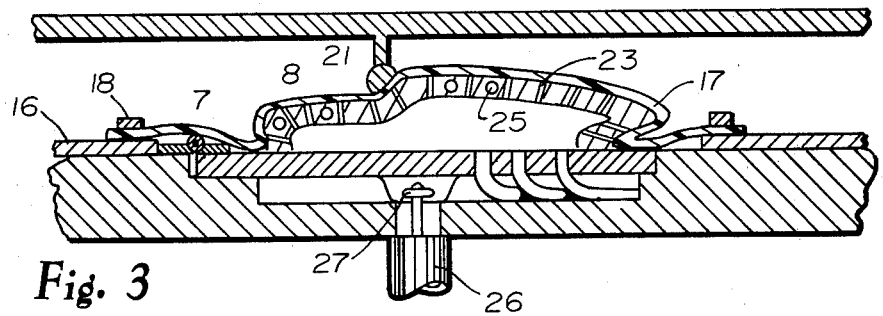
Figure 4:
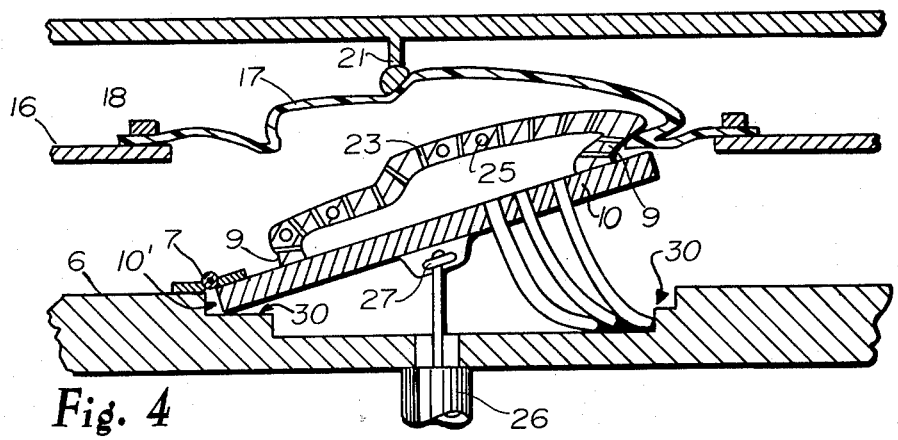

In operation, as shown in FIGS. 2 through 4, the article formed from sheet material 17 is first formed about the inflexible mold mandrel 8, e.g., heated sheet material 17, is placed on frame member 16 and clamped in place by clamp means 18. Platen 6 is moved reciprocally upward wherein inflexible mold mandrel 8 is pressed into the sheet material 17. The differential pressure is applied and the sheet material 17 is simultaneously pulled about the inflexible mold mandrel 8 as the mold mandrel is pressed into the plastic sheet material 17 by movement of the platen 6 which also presses the sheet material 17 into the plug assist 21. After the article formed from the sheet material 17 is formed about the mold mandrel 8, the mandrel 8 must be removed. Removal is best shown in FIGS. 2 through 4, wherein platen 6 is lowered, mandrel 8, which is attached to plate 10, which in turn is pivotally attached to the platen 6 by hinges 7, is partially released from the undercut article formed from sheet material 17 whereupon, as platen 6 is further lowered, the remaining portion of the mandrel 8 is released from the undercut article formed from sheet material 17, thus providing for progressively releasing the mandrel 8 from the article formed from sheet material 17. The mandrel 8 thereafter returns to its resting position as shown in FIG. 2. Optionally positioned at the underside of the mandrel 8 is a hydraulic means 26 which is pivotally attached to the underside of the plate 10 supporting mandrel 8 by pivot means 27. Thus, as the mandrel 8 is completely released from the undercut article formed from sheet material 17, the hydraulic means 26 provides for controlled return of the mandrel 8 to its resting position on platen 6, said resting position being best shown in FIG. 1.

It should be noted that the structure could be altered or modified as necessary to cause the relative movement in a manner other than specified herein. However, from the foregoing, it can be seen that this invention provides an improved apparatus and method for removing an undercut male mold mandrel from the corresponding undercut article formed about the mandrel.

I claim:

1. Apparatus for forming articles having undercut portions from sheet material, comprising:

a platen, a one-piece inflexible, undercut male mold mandrel of predetermined contour about which articles are to be formed, said mandrel having first and second ends thereof, sheet securing means for securing a sheet of material from which an article having undercut portions is to be formed in a position relative to said mandrel for article formation, so that the article to be formed will have first and second ends thereof corresponding to said first and second ends of said mandrel, means operatively associated with said sheet securing means and platen for effecting reciprocal nonpivoting movement of said sheet securing means and said platen with respect to each other, so that an article having undercut portions is formed by movement of said sheet securing means and platen toward each other with said mandrel engaging a sheet supported by said sheet securing means, and so that said article is released from engagement with said mold member by movement away from each other, means for pivotally mounting said mold mandrel with respect to said platen so that removal of the first end portion of the mandrel from the undercut article by localized distortion of the first end of the article is effected, and so that thereafter the remainder of the mandrel is removed from said undercut article by locally and progressively distorting the article towards the second end thereof so that distortion at any given time is localized and easily accommodated, said means for pviotally mounting said mold mandrel comprising a plate supporting said male mandrel and pivoted at one end thereof to said platen, said mandrel first end being located closer to said pivoted plate end than said mandrel second end, and means for allowing no relative pivotal movement between said mold mandrel mounting plate and said platen during movement of said platen and sheet securing means toward each other while allowing relative pivotal movement of said mold mandrel mounting plate and said platen during movement of said platen and sheet securing means away from each other.

2. Apparatus as recited in claim 1 wherein said inflexible undercut one-piece mandrel is aluminum.

3. Apparatus as recited in claim 1 wherein said inflexible undercut one-piece mandrel contains a plurality of passageways therein connectable source a liquid souce for circulating liquid through said passageways to effect quick uniform cooling of the article formed on the male mandrel.

4. Apparatus as recited in claim 1 further comprising differential pressure forming means for drawing the sheet material secured by said sheet material securing means into tight, form-fitting engagement with said male mandrel.

5. Apparatus as recited in claim 1 further comprising means connecting said pivoted plate supporting said mandrel to said platen so that said plate and mandrel will be gently returned to a non-pivotal position with respect to said platen after removal of said article from engagement with said mandrel.

6. Apparatus as recited in claim 5 wherein said connecting means comprises hydraulic means.

* * * * *